April 27, 1948.  T. B. BROWN  2,440,244
ELECTRICAL HOOK-ON METER SYSTEM
Filed June 4, 1943  2 Sheets-Sheet 1
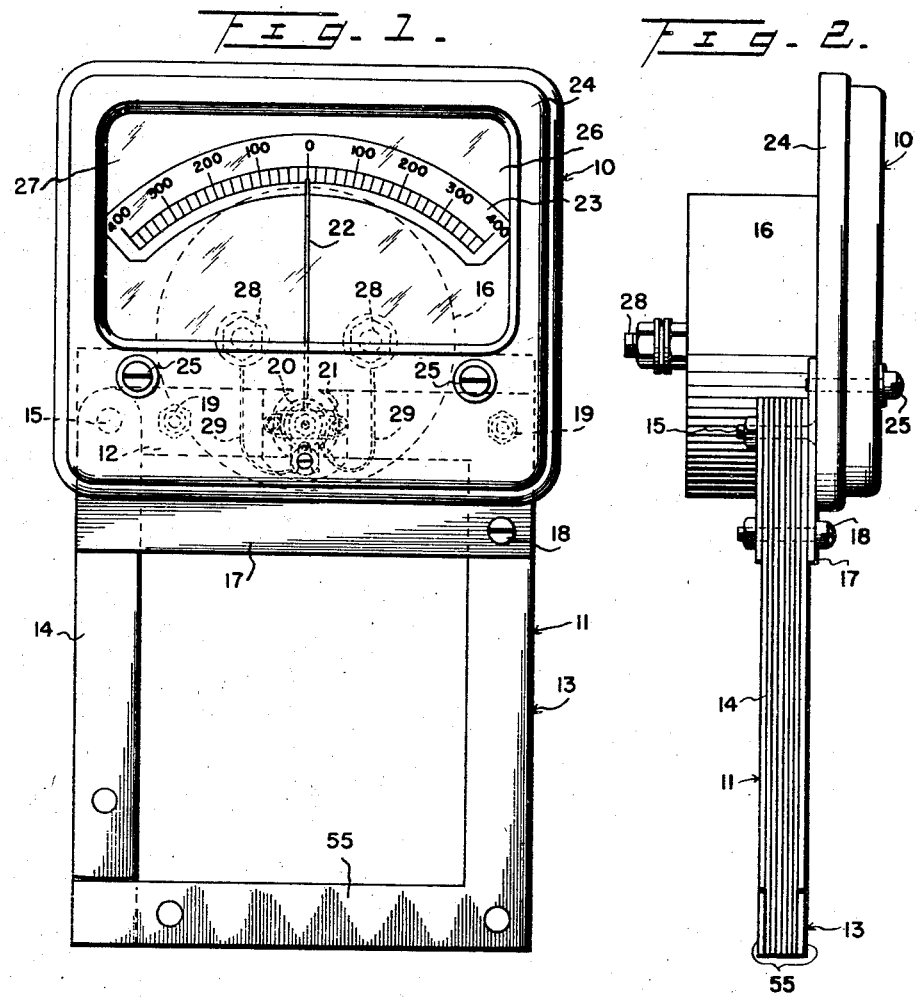
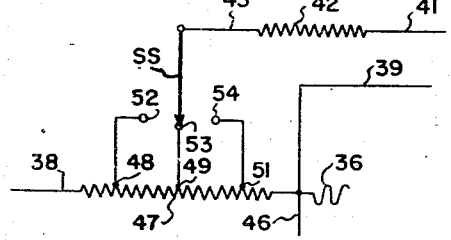
Inventor
T. B. BROWN
Attorney April 27, 1948. T. B. BROWN 2,440,244
ELECTRICAL HOOK-ON METER SYSTEM
Filed June 4, 1943 2 Sheets-Sheet 2

Inventor
T. B. BROWN

By Stone E Bush
Attorney

Patented Apr. 27, 1948

2,440,244

UNITED STATES PATENT OFFICE 2,440,244

ELECTRICAL HOOK-ON METER SYSTEM

Thomas B. Brown, Arlington, Va.

Application June 4, 1943, Serial No. 489,670

9 Claims. (Cl. 171—95)

(Granted under the act of March 3, 1883, as amended April 30, 1928; 370 O. G. 757)

This invention relates to electrical current measuring devices and more particularly to devices of the class known as meters for measuring the direct current flowing in a conductor or within a group of closely spaced electrical conductors without establishing a physical connection thereto.

In devices heretofore proposed for measuring the direct current flowing within a conductor or cable without establishing a physical contact thereto it has been the usual practice to employ a movable element comprising a magnetic vane rotatably arranged within the path of a ferric circuit comprising a split core of magnetic material arranged about the conductor to be measured and adapted to have induced therein a magnetic flux by the electric field surrounding the cable to be measured such, for example, as the device disclosed in Patent 2,146,555 for Hook-on measurement device, issued to R. G. Arey on February 7, 1939. Such devices are not altogether satisfactory in operation for the reason that the ferric moving element may take various settings for the same degree of current to be measured depending upon the residual magnetism within the rotatable element at the beginning of the measurement and the hysteric effect upon the rotatable element produced thereby.

In the arrangement of the present invention according to a preferred embodiment thereof this difficulty is eliminated by reason of the employment within the ferric circuit of a movable coil having a permeability of unity within which is flowing an electric current thereby setting up an electromagnetic field about the coil sufficient to cause the movable coil element to take settings in accordance with the electrical current flowing within the conductor, or the ampere turns of the group of conductors of a coil being measured thereby. The device of the present invention may advantageously be employed for measuring the ampere turns of a large coil of wire such, for example, as the coils of wire or cables arranged about a vessel and having an electric current flowing therein for the purpose of neutralizing the magnetic effect of the vessel whereby the vessel is adapted to pass above a magnetic mine without causing the mine to be fired, this neutralization of the magnetic field of the vessel being referred to herein as degaussing.

One of the objects of the present invention is the provision of a new and improved device for measuring the direct current flowing within a conductor without establishing a physical connection thereto.

Another of the objects is a new and improved device for measuring the ampere turns of a coil comprising a plurality of current bearing conductors in proximate relation with respect to one another.

Another object resides in the provision of a new and improved device for measuring the algebraic sum of the currents flowing in a group of closely spaced electrical conductors by employing the electromagnetic field set up about the conductors by the currents flowing therein and without establishing a physical connection thereto.

Another of the objects is the provision of a new and improved device for measuring the algebraic sum of the currents flowing in a group of closely spaced and substantially parallel conductors by a single measuring operation.

Still another object is the provision of a new and improved instrument for measuring direct current flowing within a conductor without establishing a physical connection thereto in which a substantially uniform scale is employed in connection with the movable indicating element for measuring the current.

A still further object is the provision of a new and improved device for measuring the direct current flowing within a conductor without establishing a physical connection thereto in which the movable element of the device is composed of non-magnetic material and in which the errors caused by magnetic hysteresis of the material composing the moving element are eliminated.

Still other objects, advantages and improvements will be apparent from the following description taken in connection with the accompanying drawings of which:

Fig. 1 is a view of a measuring device in accordance with a preferred embodiment of the invention;

Fig. 2 is an end view of the device of Fig. 1;

Fig. 5 shows a modification of the circuit of Fig. 4 for adapting the device for use as a multiple range meter.

Figure 3:
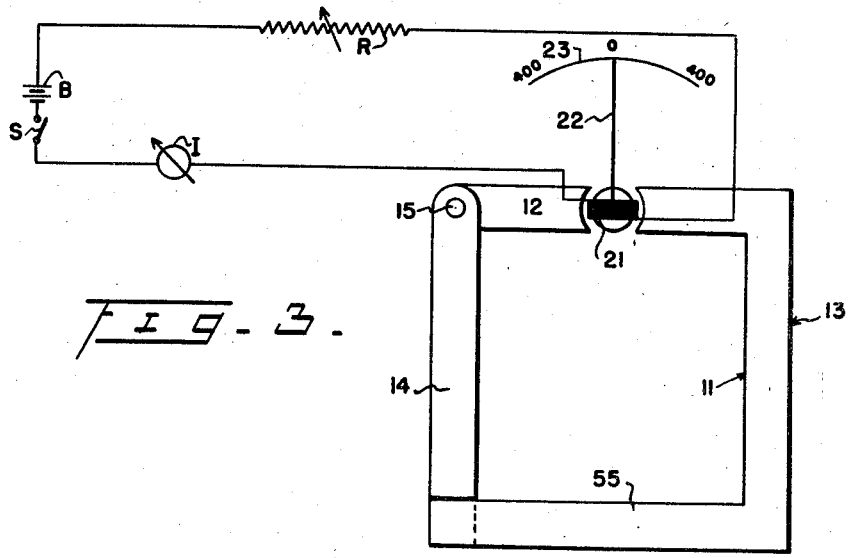
Fig. 3 illustrates diagrammatically a preferred circuit arrangement suitable for use with the device of Fig. 1.

Referring now to the drawings on which like numerals of reference are employed to designate like parts throughout the several views and more particularly to Figs. 1 and 2 thereof there is shown thereon a meter, hereinafter referred to as an ampere turn meter, indicated generally by the numeral 10 comprising a laminated core indicated generally by the numeral 11 composed of magnetic material suitable for the purpose such, for example, as a good grade of magnetic iron having the properties of high permeability and low magnetic hysteresis or the core may be composed of either of the magnetic materials known in the trade as Permalloy and Mumetal respectively. The core 11 comprises the fixed portions or legs 12 and 13 and a movable portion or leg 14 pivotally secured to the fixed portion 12 as at 15 thereby providing a structure in which the conductor or cable having a current flowing therein to be measured may be arranged within the core 11 by pivotally moving the movable portion 14 thereof outwardly and restoring the portion 14 to the position shown on the drawing after the cable or conductor has been arranged therein. The core 11 is secured to a casing 16 as by the mounting plate 17 and screws 18 and 19 and nuts threaded thereon.

Within the casing 16 is pivotally mounted a movable coil 21 having an indicating element or pointer 22 rotatable therewith and adapted to be set to different positions with respect to an indicia bearing scale 23 selectively in accordance with the strength of the electromagnetic field set up by the current bearing conductor or cable disposed within the core 11. The indicating element is yieldably urged toward an initial setting by a pair of current conducting springs 20, as is well known in the art to which the invention pertains. The device is also provided with a detachable cover 24 secured to the casing 16 as by the screws 25 and having an aperture 26 therein through which the setting of the device may be observed, the aperture being enclosed by a pane or plate 27 of transparent material suitable for the purpose such, for example, as glass as is well known in the art to which the present invention pertains.

The coil 21 is in electrical connection with a pair of screw terminals 28 as by the conductors 29 whereby the device is adapted to be connected to an external electrical circuit including a source of controlled electrical current.

On Fig. 3 is shown in diagrammatic form the direct current or ampere turn measuring device of the present invention in accordance with a preferred embodiment thereof and an external circuit suitable for use therewith, the circuit comprising a source of electrical potential B, variable resistance R, a current indicating instrument I, and switch S.

The operation of the device of Fig. 3 will now be described. The indicating instrument I, Fig. 3, is calibrated during the fabrication and adjustment thereof by placing a conductor having a predetermined current flowing therein within the core 11, moving the leg 14 to closed position, closing switch S and adjusting the resistance R until the current flowing within the coil 21 is sufficient to cause the pointer 22 to be moved to a predetermined position with respect to the scale 23. In the illustrated embodiment of the invention the device is provided with a graduated scale bearing the indicia zero, one hundred, two hundred, three hundred and four hundred corresponding respectively to the number of ampere turns of the current carrying coil or the ampere reading of a single conductor disposed within the core 11, as the case may be. The current flowing through the coil 21 is measured by the current indicating device I and the value thereof included within the calibration information of the instrument.

When it is desired to measure the current flowing within the conductor or the algebraic sum of the currents flowing within the conductors comprising an electric cable arranged within the core 11, the switch S is closed and the resistance R adjusted until a predetermined current indicated by the instrument I, flows through the pivoted coil 21. The deflection of the pointer 22 as the result of the electrodynamic reaction between the flux set up by the current bearing coil 21 and the flux within the cable between the legs 12 and 13 of the core 11 causes the movable coil 21 to be rotated from the initial zero position thereof through an angle proportional to the strength of the current or the algebraic sum of the currents flowing within the conducting elements disposed within the core 11, as the case may be. It will, of course, be understood that, if desired, the scale 23 may comprise several sets of scale divisions and indicia therefor corresponding to various ranges in the value of current flowing within the coil 21 whereby the instrument is adapted to measure currents comprising several ranges by adjusting the resistance R until the corresponding predetermined value of current is indicated by the indicating instrument I.

Preferably, though not necessarily, the core 11 is demagnetized before the current bearing conductor is placed therein. This may be accomplished in any well known manner such, for example, as by reversing the current through the coil 21 or by subjecting the core to a sharp blow as by striking the movable leg 14 sharply against the leg 13 thereof.

Figure 4:
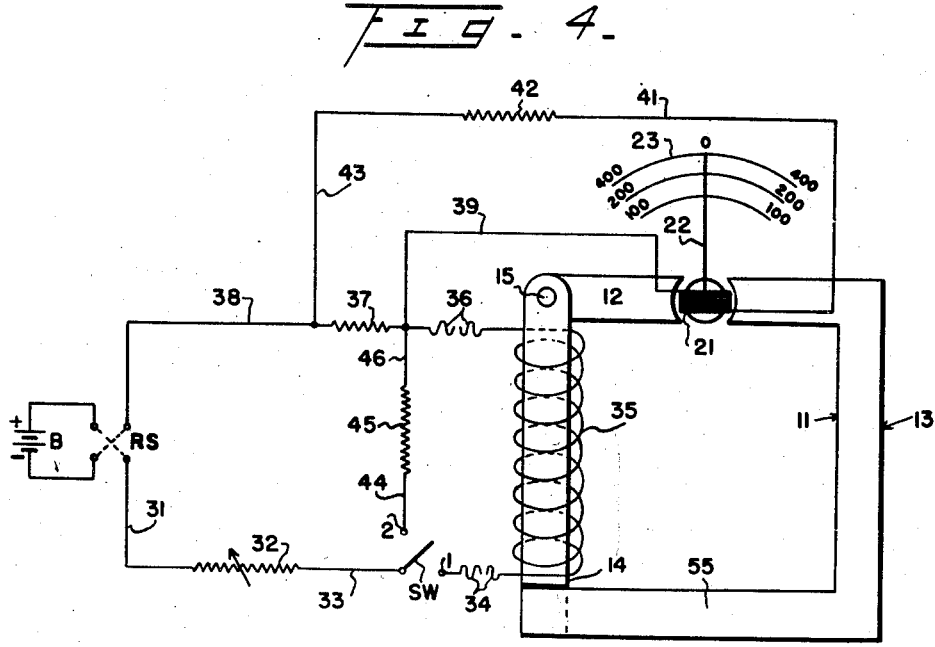
Fig. 4 shows diagrammatically an alternative arrangement of circuits suitable for use with the device of Fig. 1.

On Fig. 4 is shown an alternative arrangement of circuits and instrumentalities suitable for use with the present invention in which the indicating instrument I of Fig. 3 is not required to measure the current through the coil 21.

The operation of the instrument when the arrangement of Fig. 4 is employed will now be described. The reversing switch RS is closed and switch SW is moved into engagement with contact 1 thereof thereby closing a circuit from positive terminal of battery B by way of one pole of the reversing switch, conductor 31, adjustable resistance 32, conductor 33, switch SW and terminal 1 thereof, flexible conductor 34, winding of coil 35 arranged about the movable leg 14 of the core 11, flexible conductor 36, resistance 37, conductor 38 and thence by way of the other pole of the reversing switch RS to the negative terminal of battery B thereby energizing the coil 35 and setting up an electromagnetic flux within the core 11. There is also connected to one end of the resistance 37 a conductor 39 extending to the coil 21 from whence the circuit is continued by way of conductor 41, resistance 42 and conductor 43 to the opposite end of resistance 37 whereby the voltage drop across the resistance 37 is employed to energize the movable coil 21. The indicating element or pointer 22 of the instrument is caused to be deflected from the intial position thereof by the electrodynamic reaction between the flux set up by the current bearing coil 21 and the flux across the portions 12 and 13 of the core 11 set up by the current bearing coil 35. The resistance 32 is now adjusted until the pointer 22 coincides with the full scale reading of the instrument.

Switch SW is now moved into engagement with contact 2 thereof thereby interrupting the current flowing through the coil 35 and closing a circuit from the positive terminal of battery B by way of conductor 31, adjustable resistance 32, conductor 33, switch SW and contact 2 thereof, conductor 44, resistance element 45, conductor 46, resistance 37, conductor 38 and thence by way of the other pole of the reversing switch to the negative terminal of battery B. The resistance element 45 possesses the same value of resistance as the coil 35 and, furthermore, is composed of resistive material having the same temperature coefficient as the coil 35 whereupon the voltage drop across the resistance 37 is controlled by the adjustable resistance 32 and is independent of the setting of switch SW. With switch SW in engagement with contact 2 the current flowing through the coil 21 is the same as the current flowing through the coil 21 when the switch is in engagement with contact 1 thereof. The leg or movable portion 14 of the core is now opened and the coil 35 preferably removed therefrom. The conductor or cable to be tested is placed within the core 11 and the leg 14 is again moved to closed position in engagement with the portion 13 of the core 11.

The flux set up within the core 11 by the current carrying conductor or plural conductor cable arranged therein reacts electrodynamically with the flux set up by the current bearing coil 21 thereby causing the pointer 22 to be moved to a setting corresponding to the current flowing within the conductor or the algebraic sum of the currents flowing within the conductors of the cable, as the case may be, arranged within the core 11.

From the foregoing it will be apparent that the moving coil 21 is employed to indicate the current flowing therein controlled by the adjustment of the resistance 32 in lieu of the indicating instrument I of Fig. 3, the adjustment of the resistance 32 being unchanged during the measurement of the current bearing conductor or cable arranged within the core 11.

The values of resistances 42 and 37 are predetermined during the assembly and initial adjustment of the instrument whereby a full scale reading of the instrument is obtained when the resistance 32 is adjusted to a position such that the flux within the core 11 is of the same value as the flux produced therein by a current carrying conductor arranged within the core 11 having a predetermined direct current flowing therein. More specifically, the resistance 32 is adjusted to a predetermined ampere turn value of the induction coil 35, an ammeter being temporarily inserted in series with the resistance 32 during this initial determination of the current, and the resistances 37 and 42 are selected such that the pointer 22 is given a full scale setting corresponding to the aforesaid predetermined ampere turn value of the coil 35.

The core 11 may be demagnetized prior to taking a reading of the instrument by bringing the switch SW into engagement with contact 1 thereof and repeatedly operating the reversing switch RS to each of the reversing positions thereof in succession thereby to effect a plurality of reversals of magnetic flux within the core 11 or the core may be demagnetized by striking the leg 14 sharply against the portion 13 of the core.

A convenient arrangement for providing a multiple range meter is disclosed on Fig. 5 of the drawings on which is shown for the purpose of description a portion of the circuit arrangement of Fig. 4 in which the resistance 37 is replaced by a resistance element 47 having a plurality of taps 48, 49 and 51 connected to contacts 52, 53 and 54 respectively of the range selection switch SS. The operation of the instrument employing the circuit arrangement of Fig. 5 is generally similar to the operation of the instrument of Fig. 4, it being merely necessary to move the switch SS into engagement with contacts 52, 53 or 54 selectively in accordance with the particular range of values corresponding to the value of current or algebraic sum of the currents of the current bearing conductors within the core 11 and multiplying the reading of the instrument by the appropriate calibration factor. It will, however, be understood that, if desired, the instrument may be provided with a plurality of scales and sets of indicia corresponding respectively to each of the ranges of the instrument associated with each of the settings of the switch SS, it being merely necessary to determine the position of the taps 48, 49 and 51 on the resistance element 47 prior to the final assembly of the instrument during the fabrication and assembly thereof.

When the arrangement of Fig. 4 or 5 is employed, the current flowing through the coil 21 is adjusted to a predetermined value by the adjustable resistance 32 without the employment of an indicating device other than the indicating element 22, and, in the case of Fig. 5, the current flowing through the coil 21 is, of course, adjusted to a predetermined value corresponding to the instant setting of the switch SS. When taking a reading of a current carrying conductor or cable within the core 11 the conductor or cable is preferably maintained in contact with the lower laterally extending portion 55 of the leg 13 of the core 11 or within the lower portion of the space encompassed by the core at the distance from the moving coil 21.

Briefly stated in summary, the present invention contemplates the provision of a new and improved device for measuring direct current flowing within a conductor or the algebraic sum of the currents flowing within a group of substantially parallel conductors without establishing a physical connection thereto in which the moving element of the device is arranged within the path of an air gap formed by a pair of pole pieces within a yoke or core disposed about the current bearing conductor or conductors to be measured, and in which the movable element comprises a current carrying coil having a nonmagnetic core whereby the errors resulting from magnetic hysteresis in the movable coil are not present. Furthermore, the device of the present invention comprises means for measuring the flow of current within the movable coil by the setting of the indicating element controlled by the movable coil and without the necessity of employing an external meter connected thereto.

While the invention has been described in connection with the disclosure of two embodiments thereof which give satsifactory results, it will be obvious to those skilled in the art, after understanding the invention, that the invention may take other forms and that these forms as well as various features of construction will be apparent to those skilled in the art and, accordingly, I do not desire to be limited to the terms illustrated and described herein.

The invention herein described and claimed may be manufactured and used by or for the Government of the United States of America for governmental purposes without payment of any royalties thereon or therefor.

What is claimed as new and desired to be secured by Letters Patent of the United States is:

1. In a device of the character disclosed for measuring direct current flowing within a conductor without establishing a physical connection thereto, a core of magnetic material having a movable portion and adapted to be arranged about the conductor, a movable coil rotatably arranged within the magnetic circuit of said core, an indicating element controlled by said coil and rotatable therewith, means for yieldably urging the indicating element toward an initial setting, means for causing a predetermined flow of current within said coil whereby the electrodynamic reaction between the flux set up by the coil and the flux induced within the core by said conductor causes the indicating element to be rotatively moved from said initial setting to a setting corresponding to the current flowing within said conductor, and means for measuring said predetermined flow of current by the full scale deflection of said indicating element.

2. In a device of the character disclosed for measuring direct current flowing within a conductor without establishing a physical connection thereto, a core of magnetic material having a movable portion and adapted to be arranged about the conductor, a movable coil rotatably arranged within the magnetic circuit of said core, an indicating element controlled by said coil and rotatable therewith, means for yieldably urging the indicating element toward an initial setting, means for causing a predetermined flow of current within said coil whereby the electrodynamic reaction between the flux set up by the coil and the flux induced within the core by said conductor causes the indicating element to be rotatively moved from said initial setting to a setting corresponding to the current flowing within said conductor, means for measuring said predetermined flow of current by the full scale deflection of the indicating element, and a scale arranged adjacent said indicating element for indicating the degree of movement thereof.

3. In a device of the character disclosed for measuring direct current flowing within a conductor without establishing a physical connection thereto, a core of magnetic material having a movable portion and adapted to be arranged about the conductor, a movable coil rotatably arranged within the magnetic circuit of said core, an indicating element controlled by said coil and rotatable therewith to different settings, a source of electrical power, a circuit for operatively connecting said coil to said source of power, adjustable means included within said circuit for causing a predetermined value of current to flow within within said coil, means for indicating said predetermined value of current by the full scale deflection of said indicating element, and means for yieldably urging said indicating element toward an initial setting whereby the electrodynamic reaction between the flux set up by the coil and the flux induced within the ferric circuit of said core by the current flowing within said conductor causes the indicating element to be moved from said initial setting to a setting corresponding to the value of the current flowing within the conductor.

4. A direct current measuring device of the character disclosed comprising a separable magnetic core adapted to be arranged about a current bearing conductor, a pair of pole pieces included within said core, a movable coil rotatably disposed between said pole pieces, means for yieldably urging said coil toward a predetermined initial setting, an indicating element controlled by said coil and rotatable therewith, a scale in juxtaposition to said indicating element, said scale having a plurality of indicia thereon of which one of said indicia corresponds to said predetermined initial setting of the indicating element, means for causing a predetermined flow of current through said coil thereby to cause the coil and indicating element to take a setting corresponding to the value of current flowing within said conductor, means for measuring said predetermined flow of current by the full scale deflection of the indicating element, and means operable at will for reversing the direction of flow of the current within said coil.

5. An instrument of the character disclosed for measuring the ampere turns of a coil of wire comprising a plurality of turns of conductors having a direct current flowing therein, said instrument comprising a separable magnetic core adapted to be arranged about said conductors, a pair of pole pieces included within the core, a movable coil rotatably disposed intermediate said pair of pole pieces, an indicating element controlled by said movable coil and movable therewith to different settings, means for yieldably urging said indicating element toward an initial setting, means for causing a predetermined current to flow within said coil whereby the indicating element is moved from said initial setting to a setting corresponding to the ampere turns of said first named coil, and means for measuring said predetermined current by the full scale setting of the indicating element.

6. In a device for measuring a direct current flowing within a conductor without establishing a physical connection thereto, a core composed of magnetic material having a fixed leg and a movable leg, a coil of wire arranged about said movable leg, a source of electrical power, a circuit including a resistive element for operatively connecting said coil to said source of power, means included within said circuit for varying the current flowing therein, a movable coil rotatably mounted within the magnetic circuit of said core and having an indicating element controlled thereby and rotatable therewith, means for operatively connecting said movable coil across said resistive element whereby the movable coil is energized by current flowing therein in proportion to the voltage drop across the resistive element, a load circuit having the same resistance as said first named coil, and means operable at will for switching said load resistance into said circuit in lieu of said first named coil.

7. A multiple range ampere turn meter of the character disclosed for measuring the algebraic sum of direct currents flowing within a group of closely spaced electrical conductors without establishing a physical connection thereto, a core composed of magnetic material having a movable portion and adapted to be arranged about said group of conductors, a movable coil rotatably arranged within the magnetic circuit of said core, an indicating element controlled by said coil and rotatable therewith, means for yieldably urging the indicating element toward an initial setting, a plurality of scales adjacent said indicating element, a plurality of sets of indicia respectively associated with each of said scales and corresponding respectively to different ranges of the meter, a source of electrical power, means for establishing an electrical circuit between said movable coil and the source of power, said circuit having means for varying at will the current flowing therein, means for measuring the flow of current in the coil by the full scale setting of the indicating element, a resistor included within said circuit and having a plurality of taps connected thereto, and means settable at will for establishing an electrical connection between said movable coil and each of said taps selectively in accordance with the range of said meter employed for measuring the ampere turns of said group of conductors.

8. In a device of the character disclosed for measuring direct current flowing within a conductor without establishing a physical connection thereto, a core of magnetic material adapted to be arranged about the conductor, a pair of pole pieces included within said core, a movable coil rotatably arranged intermediate said pole pieces and having an indicating element controlled thereby, means for yieldably urging the indicating element toward an initial setting, means for causing a predetermined flow of current within said coil whereby the electrodynamic reaction between the flux set up by the coil and the flux induced within the core by said conductor causes the indicating element to be moved to a setting corresponding to the current flowing within said conductor, means for measuring said predetermined flow of current by the full scale setting of the indicating element, and a scale arranged adjacent said indicating element and having a plurality of scale markings in substantially uniform spaced relation thereon for indicating the settings of the indicating element.

9. An instrument of the character disclosed for measuring the algebraic sum of the direct currents flowing within a group of closely spaced conductors without establishing a physical connection thereto comprising a core composed of magnetic material having a movable leg and adapted to be arranged about the conductor, a coil of wire arranged about said movable leg, a source of electrical power, means including a resistive element for electrically connecting said coil of wire to said source of power, a movable coil rotatably arranged within the magnetic circuit of said core and having an indicating element controlled thereby, a branch circuit across said resistive element for operatively connecting said movable coil to said electrical connecting means whereby a predetermined fractional portion of the current flowing through said first named coil is caused to flow within said movable coil, a fixed scale disposed adjacent said indicating element and having a plurality of indicia thereon corresponding respectively to different settings of the instrument, a load circuit adapted to be switched into said electrical connecting means in lieu of said first named coil and adapted to cause said predetermined fractional portion of current to flow within the movable coil, and means for simultaneously varying the currents flowing within said first named coil and said movable coil respectively whereby the indicating element is moved to a setting opposite an indicium corresponding to the full scale deflection of the instrument.

THOMAS B. BROWN.

REFERENCES CITED

The following references are of record in the file of this patent:

UNITED STATES PATENTS

| Number | Name | Date |
| --- | --- | --- |
| 1,015,192 | Knopp | Jan. 16, 1912 |
| 1,090,419 | Sprong | Mar. 17, 1914 |
| 1,120,217 | Morris | Dec. 8, 1914 |
| 2,023,860 | Stanton | Dec. 10, 1935 |
| 2,146,555 | Arey | Feb. 7, 1939 |